US012601483B2

(12) United States Patent
DiCintio

(10) Patent No.: US 12,601,483 B2
(45) Date of Patent: Apr. 14, 2026

(54) ADDITIVELY MANUFACTURED COMBUSTION LINER AND AXIAL FUEL STAGE INJECTOR

(71) Applicant: GE Infrastructure Technology LLC, Greenville, SC (US)

(72) Inventor: Richard Martin DiCintio, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/399,823

(22) Filed: Dec. 29, 2023

(65) Prior Publication Data

US 2025/0216074 A1 Jul. 3, 2025

(51) Int. Cl.
    *F23R 3/00* (2006.01)
    *F02C 3/04* (2006.01)
(52) U.S. Cl.
    CPC ................ *F23R 3/002* (2013.01); *F02C 3/04* (2013.01); *F05D 2230/60* (2013.01); *F05D 2240/35* (2013.01)
(58) Field of Classification Search
    CPC .... F23R 3/002; F23R 3/04; F23R 3/28; F23R 3/283; F23R 3/286; F23R 3/34; F23R 3/346; F23R 3/42; F23R 3/46; F23R 3/60; F23R 2900/00017; F23R 2900/00018; F02C 3/04; F05D 2230/60; F05D 2240/35; F05D 2230/22; F05D 2230/30; B33Y 10/00; B33Y 80/00
    See application file for complete search history.

(56) References Cited

U.S. PATENT DOCUMENTS

| | | | |
|---|---|---|---|
| 5,383,766 | A | 1/1995 | Przirembel et al. |
| 5,813,836 | A | 9/1998 | Starkweather |
| 6,047,550 | A | 4/2000 | Beebe |
| 6,192,688 | B1 | 2/2001 | Beebe |
| 6,206,638 | B1 | 3/2001 | Glynn et al. |
| 6,868,676 | B1 | 3/2005 | Haynes |
| 7,568,887 | B1 | 8/2009 | Liang |
| 7,854,591 | B2 | 12/2010 | Liang |
| 8,112,216 | B2 | 2/2012 | Davis, Jr. et al. |
| 8,167,559 | B2 | 5/2012 | Liang |
| 8,402,768 | B2 | 3/2013 | Syed et al. |
| 8,601,820 | B2 | 12/2013 | Byrne et al. |
| 8,677,753 | B2 | 3/2014 | Melton et al. |

(Continued)

FOREIGN PATENT DOCUMENTS

EP          3232002 A1    10/2017

*Primary Examiner* — Loren C Edwards
(74) *Attorney, Agent, or Firm* — Charlotte Wilson; James Pemrick; Hoffman Warnick LLC

(57) ABSTRACT

A combustor for a gas turbine system includes an additively manufactured (AM) combustor body including a one-piece member. The member includes a combustion liner including a cylindrical portion and a tapered transition portion at an aft end of the cylindrical portion; and at least one axial fuel stage (AFS) injector directed into the combustion liner. The member may also include at least one flow sleeve surrounding at least part of the combustion liner; and an aft frame at the aft end of the transition portion. The AM combustor body includes a plurality of parallel, sintered metal layers. A method of manufacturing such a combustor body is also provided.

8 Claims, 8 Drawing Sheets

(56) References Cited

U.S. PATENT DOCUMENTS

| | | | |
|---|---|---|---|
| 8,683,808 B2 | 4/2014 | Venkataraman et al. | |
| 8,701,382 B2 | 4/2014 | Davis, Jr. et al. | |
| 8,701,383 B2 | 4/2014 | Venkataraman et al. | |
| 8,701,418 B2 | 4/2014 | Venkataraman et al. | |
| 8,707,707 B2 | 4/2014 | Venkataraman et al. | |
| 8,919,137 B2 | 12/2014 | Dicintio et al. | |
| 8,931,280 B2 | 1/2015 | Kaleeswaran et al. | |
| 9,052,115 B2 | 6/2015 | Stoia et al. | |
| 9,097,424 B2 | 8/2015 | Chen et al. | |
| 9,140,455 B2 | 9/2015 | Stoia et al. | |
| 9,151,500 B2 | 10/2015 | Chen et al. | |
| 9,284,888 B2 | 3/2016 | Romig et al. | |
| 9,316,396 B2 | 4/2016 | DiCintio et al. | |
| 9,447,971 B2 | 9/2016 | Kim et al. | |
| 9,617,859 B2 | 4/2017 | Morgan et al. | |
| 9,938,903 B2 | 4/2018 | Hughes et al. | |
| 9,945,294 B2 | 4/2018 | Hughes et al. | |
| 9,945,562 B2 | 4/2018 | Hughes et al. | |
| 9,976,487 B2 | 5/2018 | Hughes et al. | |
| 9,989,260 B2 | 6/2018 | Hughes et al. | |
| 9,995,221 B2 | 6/2018 | Hughes et al. | |
| 10,006,367 B2 | 6/2018 | Romanov et al. | |
| 10,100,646 B2 | 10/2018 | Propheter-Hinckley et al. | |
| 10,220,474 B2 | 3/2019 | Theuer et al. | |
| 10,228,138 B2 | 3/2019 | Theuer et al. | |
| 10,364,681 B2 | 7/2019 | Krumanaker et al. | |
| 10,704,399 B2 | 7/2020 | Lacy et al. | |
| 10,760,430 B2 | 9/2020 | Lacy et al. | |
| 10,927,680 B2 | 2/2021 | Lacy et al. | |
| 10,941,944 B2 * | 3/2021 | Binek | F23R 3/343 |
| 11,021,969 B2 | 6/2021 | Krumanaker et al. | |
| 11,041,389 B2 | 6/2021 | Lacy et al. | |
| 11,187,415 B2 | 11/2021 | Jones et al. | |
| 11,371,699 B2 | 6/2022 | Bolanos Chaverri et al. | |
| 11,434,821 B2 | 9/2022 | Wertz | |
| 11,566,536 B1 | 1/2023 | Cox | |
| 11,767,766 B1 | 9/2023 | Matthews et al. | |
| 2012/0304648 A1 * | 12/2012 | Byrne | F23R 3/06 60/737 |
| 2013/0031904 A1 * | 2/2013 | Garry | F23R 3/002 60/722 |
| 2014/0216043 A1 * | 8/2014 | Cai | F23R 3/005 60/755 |
| 2014/0260277 A1 * | 9/2014 | DiCintio | F23R 3/46 60/722 |
| 2019/0120064 A1 | 4/2019 | Jennings et al. | |
| 2020/0049349 A1 * | 2/2020 | Amble | F23R 3/007 |

* cited by examiner

FIG. 9

ADDITIVELY MANUFACTURED COMBUSTION LINER AND AXIAL FUEL STAGE INJECTOR

TECHNICAL FIELD

The disclosure relates generally to turbomachine combustors and, more specifically, to an additively manufactured combustion liner and axial fuel stage injector.

BACKGROUND

Gas turbine systems include a combustion section including a plurality of combustors in which fuel is combusted to create a flow of combusted gas that is converted to kinetic energy in a downstream turbine (e.g., an expansion turbine). Current combustors include a large number of parts that are separately manufactured and need to be assembled together. To illustrate, a description of assembly of just the largest parts of the combustor is as follows. A combustor may include a cylindrical portion of a combustion liner concentrically located inside a flow sleeve. The cylindrical portion of the combustion liner and flow sleeve are typically made of sheet material rolled or stamped into cylindrical or frusto-cylindrical shapes. The flow sleeve is mounted about the combustion liner with mechanical couplers, e.g., with both parts mechanically coupled to a head end fuel injector assembly of the combustor. A tapered transition portion of the combustion liner changes the shape of the flow path from the circular cross-sectional shape of the cylindrical portion of the combustion liner to a more arcuate, rectangular cross-sectional shape of an aft frame. The tapered transition portion is typically made by stamped and welded together metal sheets. The forward end of the tapered transition portion is welded to an aft end of the cylindrical portion of the combustion liner. The aft frame couples the tapered transition portion to a turbine inlet. The aft frame is typically made by casting or other process. The aft frame is welded to an aft end of the tapered transition portion.

Smaller parts such as axial fuel stage (AFS) fuel injectors, which inject fuel into the combustion liner downstream of axial fuel nozzles in the head end assembly, are made using separate more complex processes. Openings are machined into the combustion liner for the AFS injectors. Mounts are then welded adjacent each opening, and the AFS injectors are bolted to the mounts. Once assembled, the entire combustor may be exposed to other processing to ensure that the tolerance requirements of the final geometry are met.

The manufacture of the parts and the assembly thereof to form a combustor can take weeks. Additive manufacturing such as direct metal laser melting (DMLM) or selective laser melting (SLM) has emerged as a reliable manufacturing method for making smaller parts.

BRIEF DESCRIPTION

All aspects, examples and features mentioned below can be combined in any technically possible way.

An aspect of the disclosure provides a combustor for a gas turbine system, the combustor comprising: an additively manufactured (AM) combustor body including a one-piece member including: a combustion liner including a cylindrical portion and a tapered transition portion, and at least one axial fuel stage (AFS) injector directed into the combustion liner, wherein the AM combustor body includes a plurality of parallel, sintered metal layers.

Another aspect of the disclosure includes any of the preceding aspects, and the AM combustor body further includes at least one flow sleeve surrounding at least part of the combustion liner.

Another aspect of the disclosure includes any of the preceding aspects, and the AM combustor body further includes at least one fuel passage extending longitudinally in the at least one flow sleeve from a forward end thereof to the at least one AFS injector.

Another aspect of the disclosure includes any of the preceding aspects, and the AM combustor body further includes at least one fuel passage extending longitudinally in the combustion liner from a forward end thereof to the at least one AFS injector.

Another aspect of the disclosure includes any of the preceding aspects, and the AM combustor body further includes a plurality of cooling passages extending at least partially longitudinally in the combustion liner.

Another aspect of the disclosure includes any of the preceding aspects, and further comprising a separate head end fuel nozzle assembly coupled to a forward end of the AM combustor body.

Another aspect of the disclosure includes any of the preceding aspects, and the AM combustor body further includes an aft frame at an aft end of the tapered transition portion of the combustion liner.

Another aspect of the disclosure includes a gas turbine (GT) system, comprising: a compressor section; a combustion section operatively coupled to the compressor section; and a turbine section operatively coupled to the combustion section, wherein the combustion section includes at least one combustor including an additively manufactured (AM) combustor body including a one-piece member including: a combustion liner including a cylindrical portion and a tapered transition portion, and at least one axial fuel stage (AFS) injector directed into the combustion liner, wherein the AM combustor body includes a plurality of parallel, sintered metal layers.

Another aspect of the disclosure includes any of the preceding aspects, and the AM combustor body further includes at least one flow sleeve surrounding at least part of the combustion liner.

Another aspect of the disclosure includes any of the preceding aspects, and the AM combustor body further includes at least one fuel passage extending longitudinally in the at least one flow sleeve from a forward end thereof to the at least one AFS injector.

Another aspect of the disclosure includes any of the preceding aspects, and the AM combustor body further includes at least one fuel passage extending longitudinally in the combustion liner from a forward end thereof to the at least one AFS injector.

Another aspect of the disclosure includes any of the preceding aspects, and the AM combustor body further includes a plurality of cooling passages extending at least partially longitudinally in the combustion liner.

Another aspect of the disclosure includes any of the preceding aspects, and further comprising a separate head end fuel nozzle assembly coupled to a forward end of the AM combustor body.

Another aspect of the disclosure includes any of the preceding aspects, and the combustion section includes a plurality of combustors, each combustor including the AM combustor body.

Another aspect of the disclosure includes a method, comprising: additively manufacturing a combustor body including a one-piece member including: a combustion liner including a cylindrical portion and a tapered transition portion, and at least one axial fuel stage (AFS) injector directed into the combustion liner, and an aft frame at an aft end of the tapered transition portion of the combustion liner, wherein the combustor body includes a plurality of parallel metal layers; coupling a head end fuel nozzle assembly to an aft end of the combustor body; and coupling a turbine inlet to the aft frame.

Another aspect of the disclosure includes any of the preceding aspects, and the additive manufacturing includes additively manufacturing the combustor body with at least one fuel passage extending longitudinally in the at least one flow sleeve from a forward end thereof to the at least one AFS injector.

Another aspect of the disclosure includes any of the preceding aspects, and the additive manufacturing includes additively manufacturing the combustor body with at least one fuel passage extending longitudinally in the combustion liner from a forward end thereof to the at least one AFS injector.

Another aspect of the disclosure includes any of the preceding aspects, and the additive manufacturing includes additively manufacturing a plurality of cooling passages extending at least partially longitudinally in the combustion liner.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 9 shows a functional block diagram of an illustrative gas turbine system capable of use with a combustor and combustor body according to the various embodiments of the disclosure.

Figure 1:
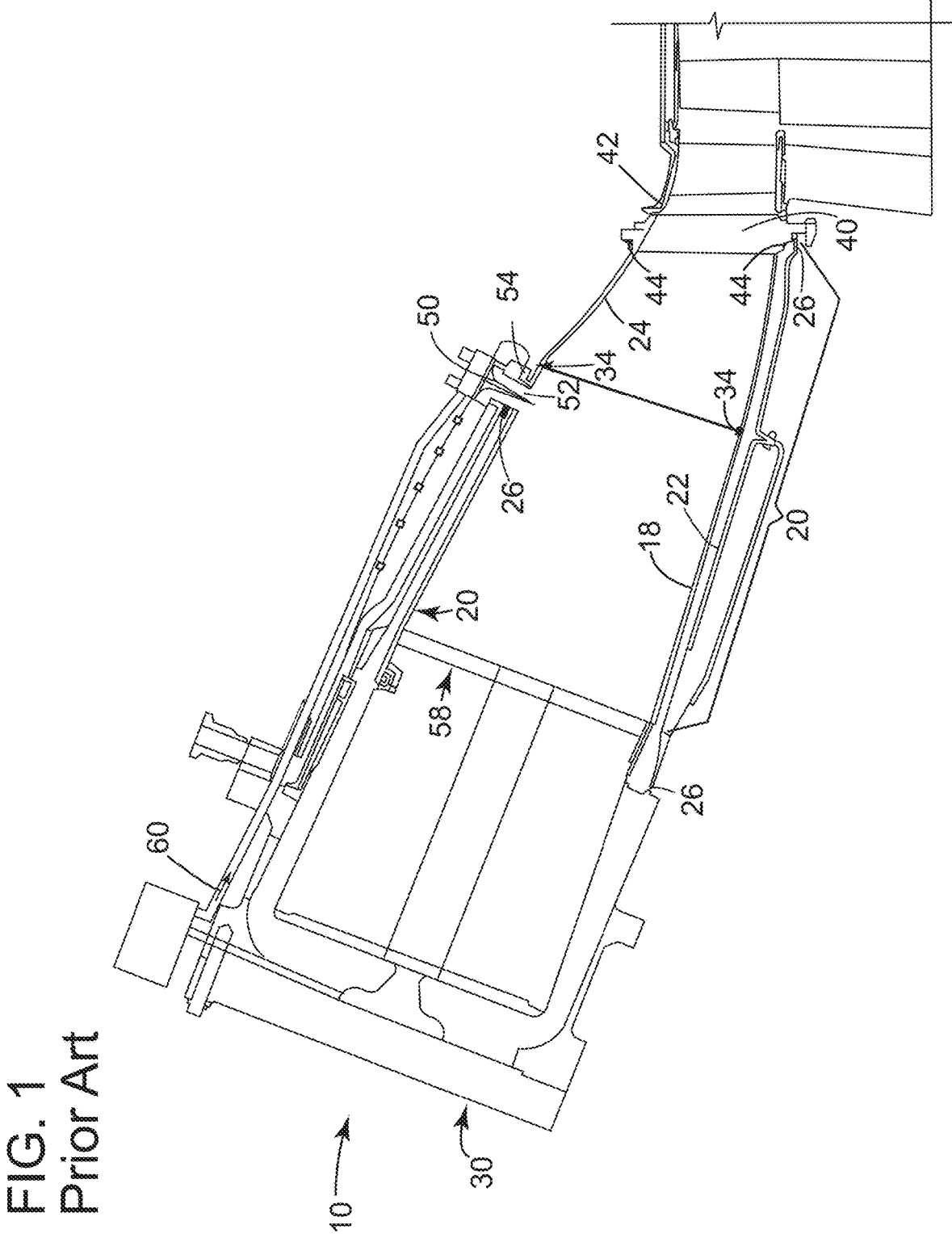
FIG. 1 shows a cross-sectional side view of a portion of a conventional combustor.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through a combustor of the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

The term "axial" refers to movement or position parallel to an axis, e.g., an axis of a combustor or turbomachine. The term "radial" refers to movement or position perpendicular to an axis, e.g., an axis of a combustor or a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a combustion liner or a circumferential interior of casing extending about a combustor. As indicated above and depending on context, it will be appreciated that such terms may be applied in relation to the axis of the combustor or the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur, or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Figure 2:
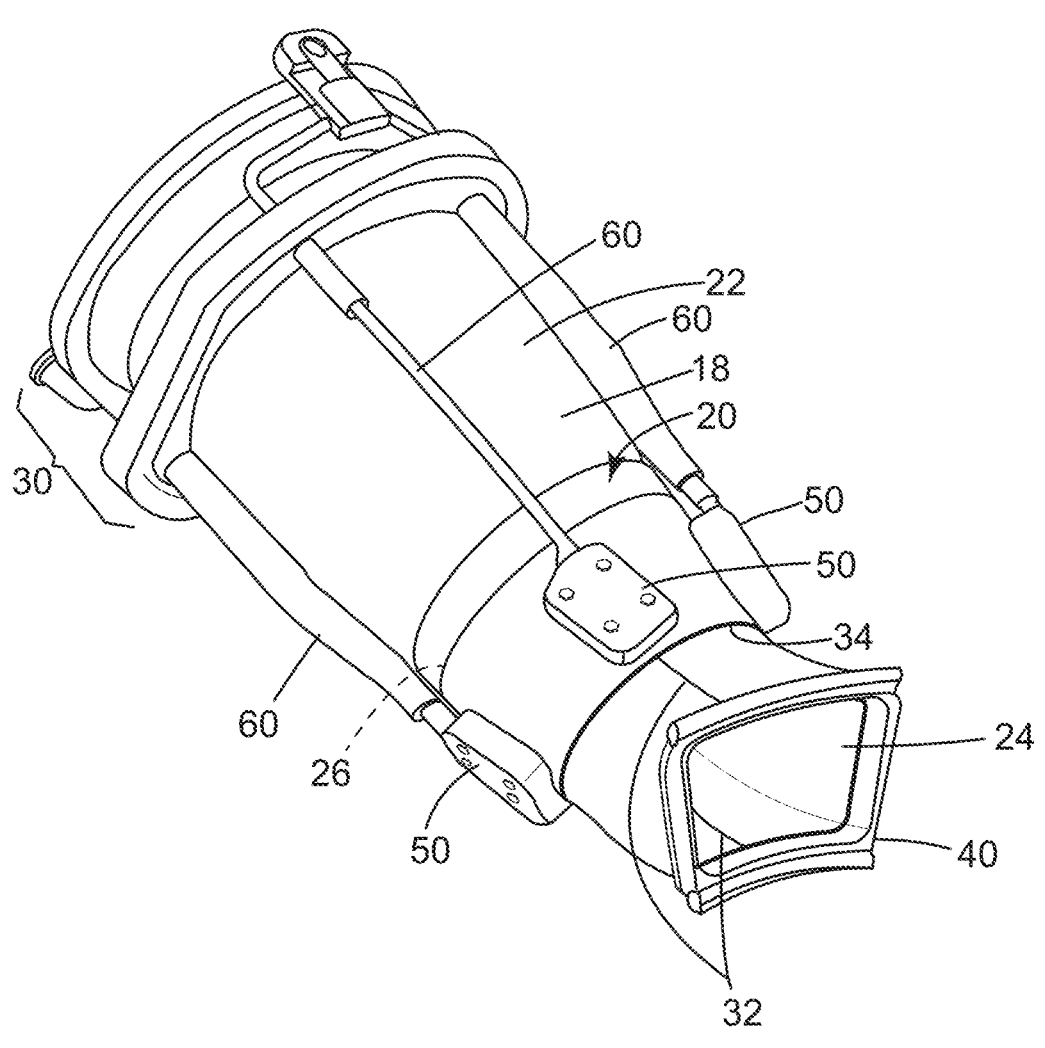
FIG. 2 shows a perspective view of the combustor of FIG. 1.

As noted, current combustors include a large number of parts that are separately manufactured and need to be assembled together. FIG. 1 shows a cross-sectional side view of a portion of a conventional combustor 10; and FIG. 2 shows a perspective view of the combustor of FIG. 1. Combustor 10 includes a cylindrical portion 18 of a combustion liner 20 concentrically located inside a flow sleeve 22. Cylindrical portion 18 of combustion liner 20 and flow sleeve 22 are typically made of sheet material rolled or stamped into cylindrical or frustoconical shapes and welded together. Flow sleeve 22 is mounted about cylindrical portion 18 of combustion liner 20 and/or a tapered transition portion 24 of combustion liner 20 with mechanical couplers or welds 26. Cylindrical portion 18 of combustion liner 20 and flow sleeve 22 are coupled in a spaced manner relative to a head end assembly 30 of combustor 10, which contains one or more fuel nozzles.

Tapered transition portion 24 of combustion liner 20 is typically made by stamped and welded together metal sheets, e.g., see weld seam 32 (FIG. 2). An upstream end of tapered transition portion 24 is welded at welds 34 to an aft end of cylindrical portion 18 of combustion liner 20. Aft frame 40, which couples tapered transition portion 24 to a turbine inlet 42, is typically made by casting or another process. Aft frame 40 is welded at welds 44 to an aft end of tapered transition portion 24.

Smaller parts such as axial fuel stage (AFS) fuel injectors 50 are made using other processes. Openings 52 are separately machined into combustion liner 20 for AFS injectors 50, and mounts 54 are then welded adjacent each opening 52 in combustion liner 20 so AFS injectors 50 can be bolted to mounts 54. Fuel lines 60 for AFS injectors 50 are mounted to an exterior of flow sleeve 22.

As illustrated, each component described may include a large number of sub-parts including but not limited to mounting fasteners or welds, heat or protective shields, seals, spacers, and couplers. Once assembled, the entire combustor 10 may be exposed to other processing to ensure that the tolerance requirements of the final geometry are met. The manufacture of the parts and the assembly thereof to form combustor 10 can take weeks or much longer.

In order to address these and other challenges, the disclosure provides a combustor for a gas turbine system. The combustor includes an additively manufactured (AM) combustor body including a one-piece member. The one-piece member includes a combustion liner, a tapered transition portion at an aft end of the combustion liner, at least one axial fuel stage (AFS) injector directed into the combustion liner, and an aft frame. In certain versions, the one-piece member may also include at least one flow sleeve surrounding at least part of the combustion liner. The AM combustor body includes a plurality of parallel, sintered metal layers. The AM combustor body lowers the costs of the combustor body by eliminating numerous parts and many of the required assembly steps. For example, the AM combustor body allows for printing of the AFS injector fuel lines into the combustor body rather than as separate fuel lines coupled to an exterior of a flow sleeve, or it may facilitate elimination of the flow sleeve(s). The additive manufacturing results in as much as a 70% reduction in parts within a given combustor. The AM combustor body also provides improved durability compared to conventional versions by eliminating welds and providing the ability to design out stress-rising geometries, e.g., a high-stress weld between the aft end of the tapered transition portion and the aft frame. Additive manufacture also allows for quick and easy manufacturing updates. Moreover, the AM combustor body reduces leakages of cooling air, thereby maintaining desired pressure ratios within the fuel nozzles of head end assembly 30.

Figure 3:
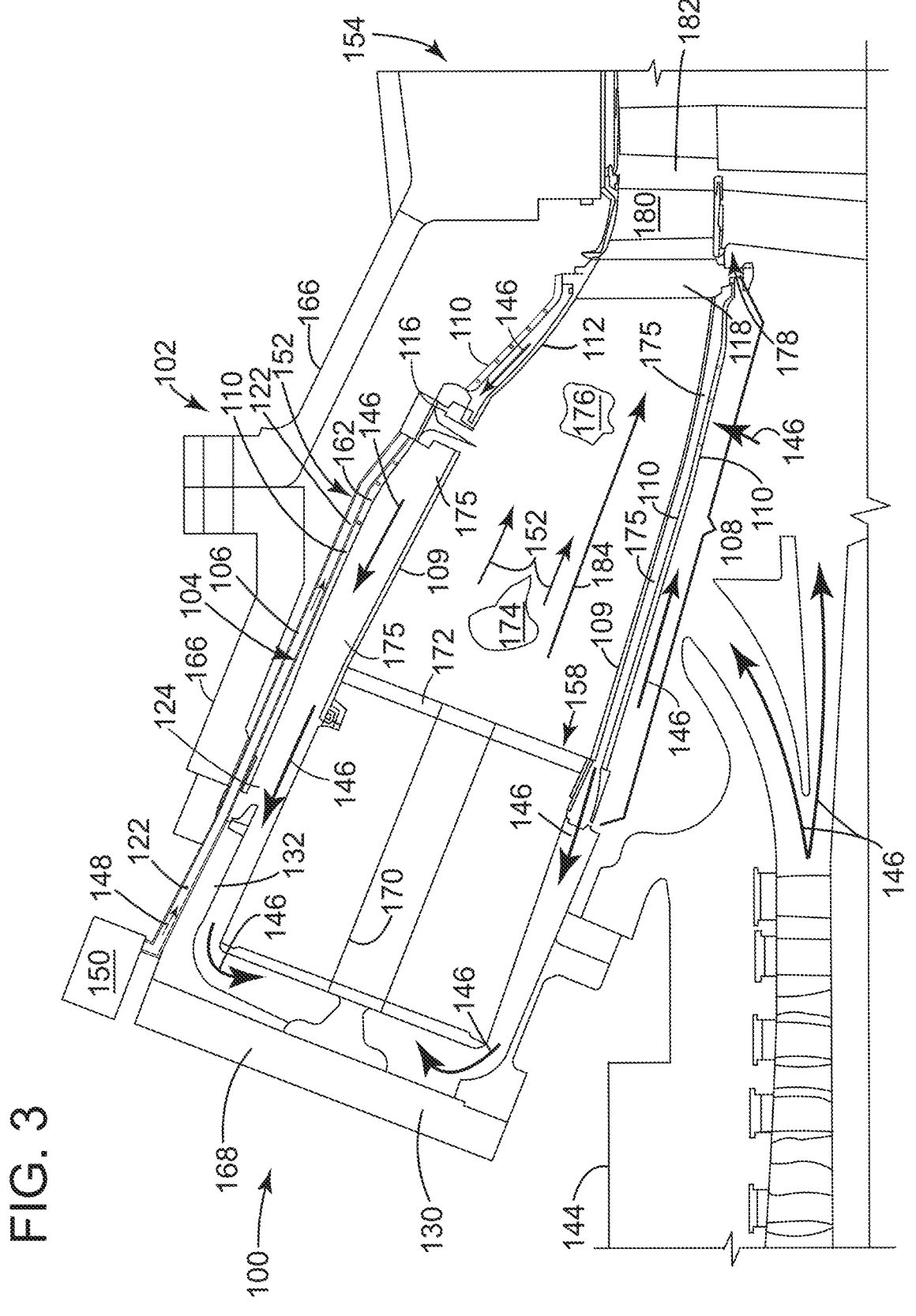
FIG. 3 shows a cross-sectional side view of a portion of a combustor with an additively manufactured combustor body according to embodiments of the disclosure.
Figures 4, 5:
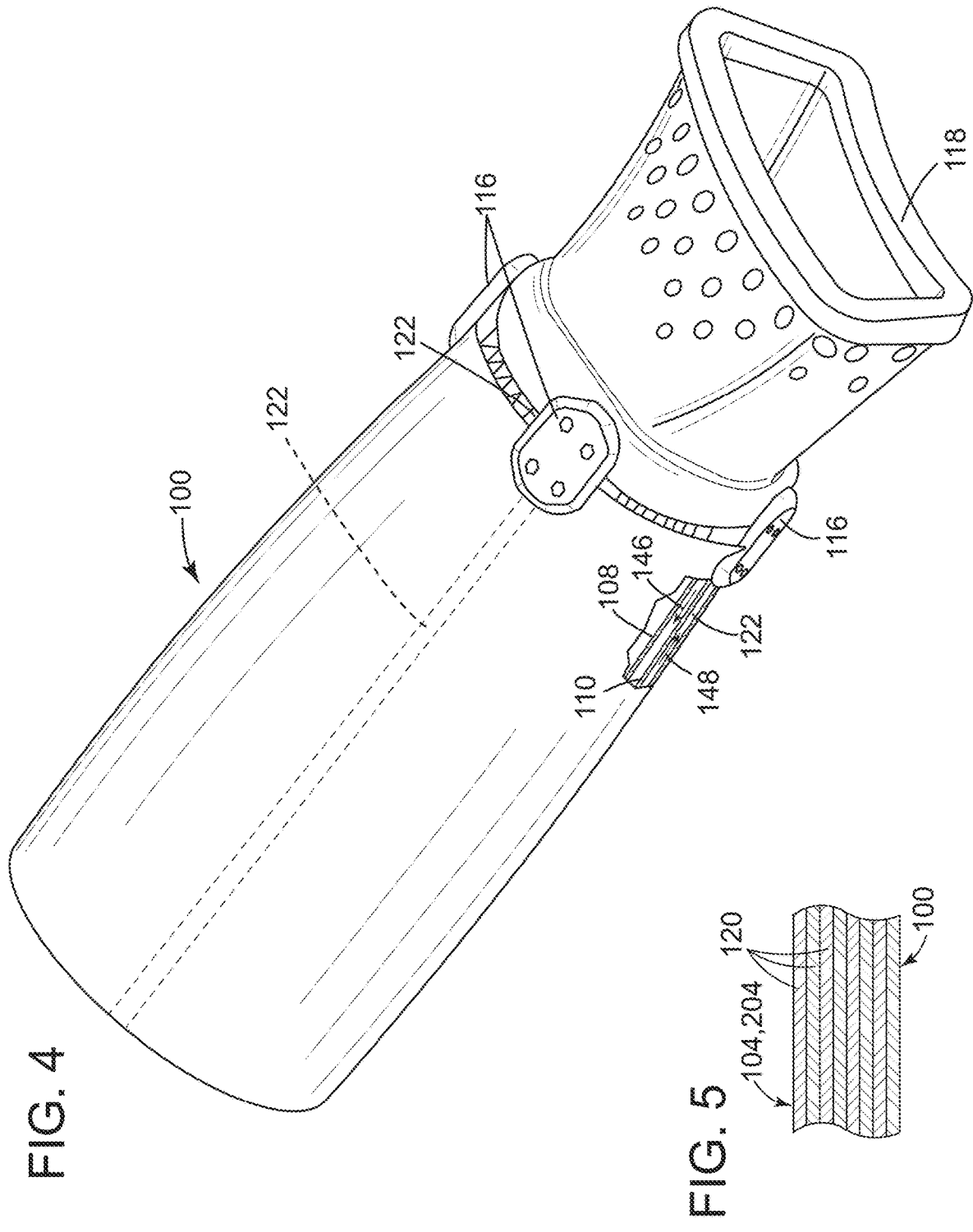
FIG. 4 shows a side perspective view of the combustor and combustor body of FIG. 3.
FIG. 5 shows a cross-sectional view of a plurality of parallel, sintered metal layers of the combustor body according to embodiments of the disclosure.

FIG. 3 shows a cross-sectional side view of a portion of a combustor 100 (positioned within a gas turbine (GT) system 102) according to embodiments of the disclosure, and FIG. 4 shows a perspective view of combustor 100 of FIG. 3. As shown in FIGS. 3 and 4, combustor 100 for GT system 102 includes an additively manufactured combustor body 104 including a one-piece member 106 including: a combustion liner 108 including a cylindrical portion 109 and a tapered transition portion 112, at least one axial fuel stage (AFS) injector 116 directed into combustion liner 108, and an aft frame 118 at an aft end of tapered transition portion 112 of combustion liner 108. Embodiments of the disclosure may also include at least one flow sleeve 110 surrounding at least part of combustion liner 108. As a result of the additive manufacturing, there are no mechanical connections between the various parts (i.e., it is all one-piece). FIG. 5 shows a schematic cross-sectional view of any portion of additively manufactured combustor body 104 (hereafter "AM combustor body 104" or "combustor body 104"). As shown in FIG. 5, AM combustor body 104 includes a plurality of parallel, sintered metal layers 120, i.e., from the additive manufacturing thereof.

Figure 6A:
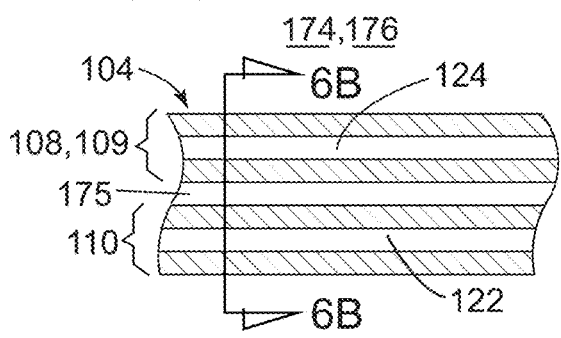
FIGS. 6A-F show cross-sectional views of coolant passage(s) in a combustion liner and fuel passages in at least one flow sleeve of the combustor body according to embodiments of the disclosure.
Figure 6B:
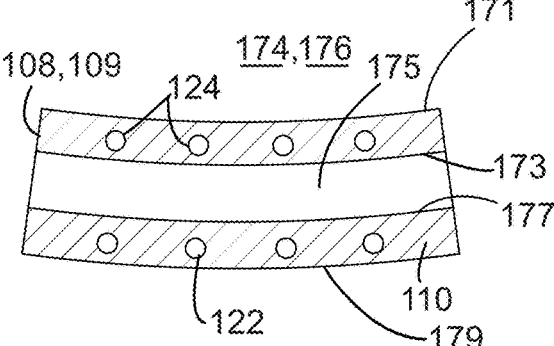
Figure 6C:
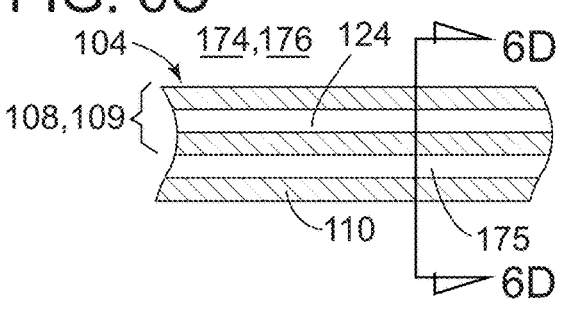
Figure 6D:
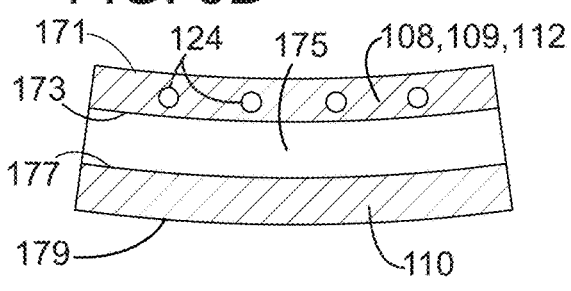
Figure 6E:
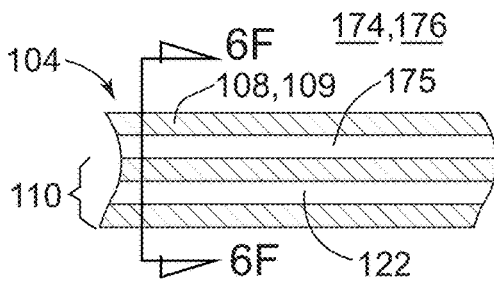
Figure 6F:
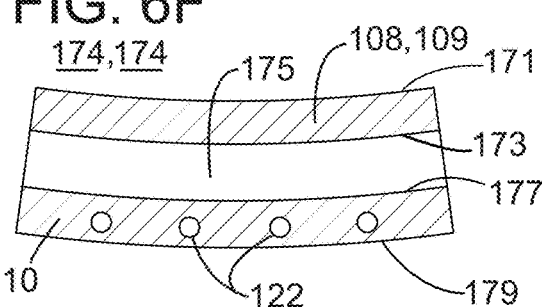

In certain embodiments, AM combustor body 104 further includes at least one fuel passage 122 extending longitudinally in the at least one flow sleeve 110 from a forward end thereof to AFS injector(s) 116. Fuel passage(s) 122 are integrally formed in flow sleeve(s) 110 and thus in combustor body 104, eliminating the need for separate fuel lines mounted to combustor body 104. AM combustor body 104 may further include a plurality of cooling passages 124 extending at least partially longitudinally in combustion liner 108, e.g., in cylindrical portion 109 thereof. FIGS. 6A-F show enlarged cross-sectional views of combustion liner 108 and flow sleeve(s) 110 with cooling passage(s) 124 and/or fuel passage(s) 122 therein. FIGS. 6A, 6C, 6E show longitudinal cross-sectional views, and FIGS. 6B, 6D and 6F show axial cross-sectional views (see view lines 6B-6B in FIG. 6A, 6D-6D in FIG. 6C, and 6F-6F in FIG. 6E).

Cooling passage(s) 124 may be integrally formed to extend at least partially longitudinally along combustion liner 108. Cooling passages 124 can be arranged (e.g., number, circumferential spacing, path, length, cross-sectional shape and/or dimensions, etc.) within combustion liner 108 in any desired manner to deliver the desired cooling effect. Each cooling passage 124 can have an inlet and outlet (not shown) anywhere necessary to have a coolant, e.g., compressed air 146 from compressor 144, flow therethrough. Because the cooling passages 124 are formed integrally with the AM combustor body 104, the cooling passages 124 may be localized in areas known to experience high temperatures (e.g., by having more cooling passages 124 in a given area). In FIGS. 6A-F, fluid flow passage(s) 175, as will be further described, are defined between combustion liner 108 and flow sleeve(s) 110.

Fuel passage(s) 122 can be arranged (e.g., number, circumferentially spacing, path, length, cross-sectional shape and/or dimensions, etc.) within flow sleeve(s) 110 in any desired manner to deliver fuel 148 to AFS injectors 116. Fuel passages 122 may operatively couple to fuel supply 150 (FIG. 3) in any manner to deliver fuel 148 to AFS injectors 116. Although illustrated in FIG. 4 as being straight conduits, fuel passages 122 may define a serpentine, sinusoidal, helical, or other meandering shape, such that the fuel conveyed through the fuel passages 122 is heated before being injected through AFS injectors 116. The formation of fuel passages 122 of various shapes and/or dimensions is made possible by the use of additive manufacturing to produce the combustion liner 108, 208.

FIG. 6A-B show cooling passage(s) 124 in a combustion liner 108 and fuel passage(s) 122 in flow sleeve(s) 110 with fluid flow passage 175 therebetween; FIGS. 6C-D show cooling passage(s) 124 in combustion liner 108 with no fuel passages in flow sleeve 110; and FIGS. 6E-F show fuel passage(s) 122 in flow sleeve(s) 110 with fluid flow passage 175 between flow sleeve 110 and combustion liner 108 and with no cooling passages 124 in combustion liner 108. As shown in FIGS. 6B, 6D, and 6F, cooling passage(s) 124 in combustion liner 108 are positioned between combustion liner exterior surfaces 171, 173, and fuel passage(s) 122 in flow sleeve(s) 110 are positioned between flow sleeve exterior surfaces 177, 179. Different areas of a single combustor 200 may include any of the arrangements shown in FIGS. 6A-F.

Figure 7:
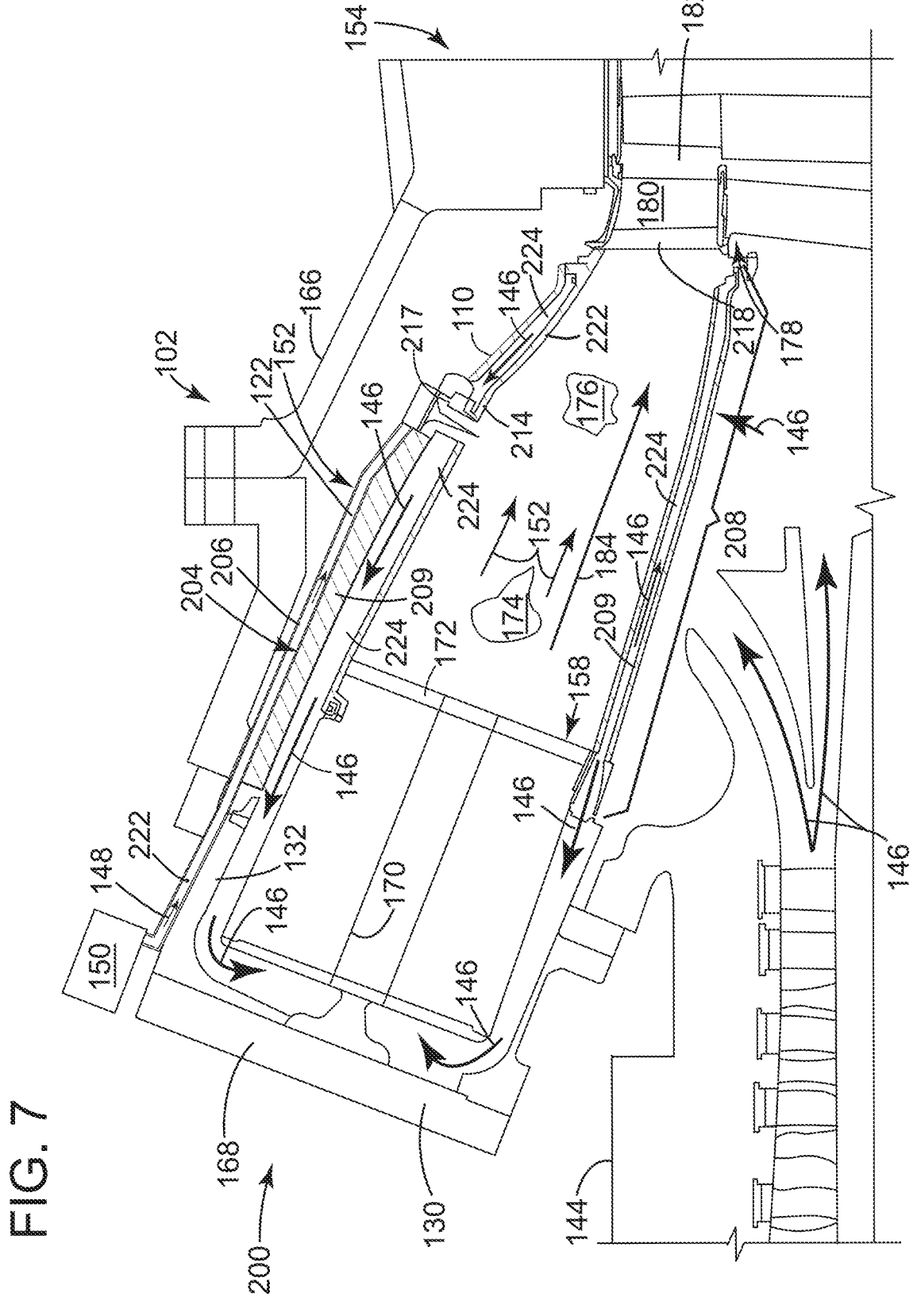
FIG. 7 shows a cross-sectional side view of a portion of a combustor with an additively manufactured single wall combustor body according to other embodiments of the disclosure.

FIG. 7 shows a cross-sectional side view of a portion of a combustor 200 (positioned within a gas turbine (GT) system 102) according to other embodiments of the disclosure. This embodiment is substantially similar to the FIG. 3 embodiment except a combustion liner 208 is a single wall structure and any flow sleeves are omitted. As shown in FIG. 7, combustor 200 for GT system 102 includes an additively manufactured combustor body 204 including one-piece member 206 including: a combustion liner 208 including a cylindrical portion 209 and a tapered transition portion 213 at an aft end 215 of combustion liner 208, at least one axial fuel stage (AFS) injector 217 directed into combustion liner 208, and an aft frame 219 at an aft end of tapered transition portion 213. As a result of the additive manufacturing, there are no mechanical connections between the various parts (i.e., it is all one-piece). That is, as shown in FIG. 5, AM combustor body 204 includes a plurality of parallel, sintered metal layers 120, i.e., from the additive manufacturing thereof.

Figure 8A:
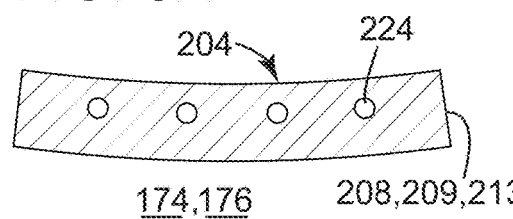
FIG. 8A shows a cross-sectional view of a cooling passage in a single wall combustor body according to other embodiments of the disclosure.
Figure 8B:
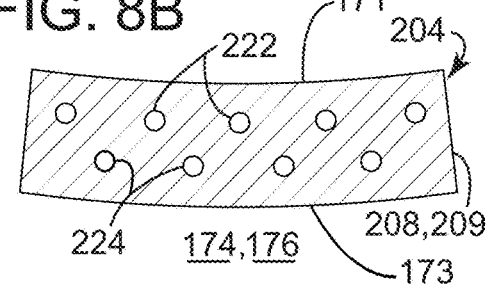
FIG. 8B shows a cross-sectional view of a cooling passage and fuel passage in a single wall combustor body according to other embodiments of the disclosure.

In certain embodiments, AM combustor body 204 further includes at least one fuel passage 222 extending longitudinally in AM combustor body 204 from a forward end thereof to AFS injector(s) 217, e.g., in cylindrical portion 209. Fuel passage(s) 222 are integrally formed in single walled combustor body 204, i.e., in cylindrical portion 209 of combustion liner 108. AM combustor body 204 may further include a plurality of cooling passages 224 extending at least partially longitudinally in combustion liner 208. FIGS. 8A-B show enlarged cross-sectional views of combustion liner 208 with cooling passage(s) 224 and/or fuel passage(s) 222 therein. FIGS. 8A-B are axial cross-sectional views (similar to FIGS. 6B, 6D and 6F).

Cooling passage(s) 224 may be integrally formed to extend at least partially longitudinally along combustion liner 208. Cooling passages 224 can be arranged (e.g., number, circumferential spacing, path, length, cross-sectional shape and/or dimensions, etc.) within combustion liner 208 in any desired manner to deliver the desired cooling effect. Each cooling passage 224 can have an inlet and outlet (not shown) anywhere necessary to have a coolant, e.g., compressed air 146 from compressor 144, flow therethrough. Because the cooling passages 224 are formed integrally with the AM combustor body 104, the cooling passages 124 may be localized in areas known to experience high temperatures (e.g., by having more cooling passages 124 in a given area).

FIG. 8A shows cooling passage(s) 224 in combustion liner 208 (cylindrical portion 209 and/or tapered transition portion 213); and FIG. 8B shows cooling passage(s) 224 and fuel passage(s) 222 in cylindrical portion 209 of combustion liner 108. As shown in FIG. 8B, cooling passage(s) 224 and fuel passage(s) 222 are positioned between combustion liner exterior surfaces 171, 173. In FIGS. 8A-B, there is no fluid flow passage(s) 175 as in FIGS. 6A-D, and flow sleeve(s) are omitted. Fuel passage(s) 222 can be arranged (e.g., number, circumferential spacing, path, length, cross-sectional shape and/or dimensions, etc.) within combustion liner 208 in any desired manner to deliver fuel 148 to AFS injectors 217. Fuel passages 222 may operatively couple to fuel supply 150 (FIG. 7) in any manner to deliver fuel 148 to AFS injectors 217.

As shown in FIGS. 3, 4 and 7, combustor 100, 200 may include a separate head end fuel nozzle assembly 130 coupled to a forward end 132 of AM combustor body 104. Head end fuel nozzle assembly 130 may include any now known or later developed fuel nozzle assembly for delivering fuel to primary combustion zone 174 from axially extending fuel nozzles 170. The fuel delivered to the head end fuel nozzle assembly 130 may be the same fuel 148 and/or fuel supply 150 as used by the AFS injectors 116, 217, or a different fuel and/or different fuel supply may be used.

Figure 9:
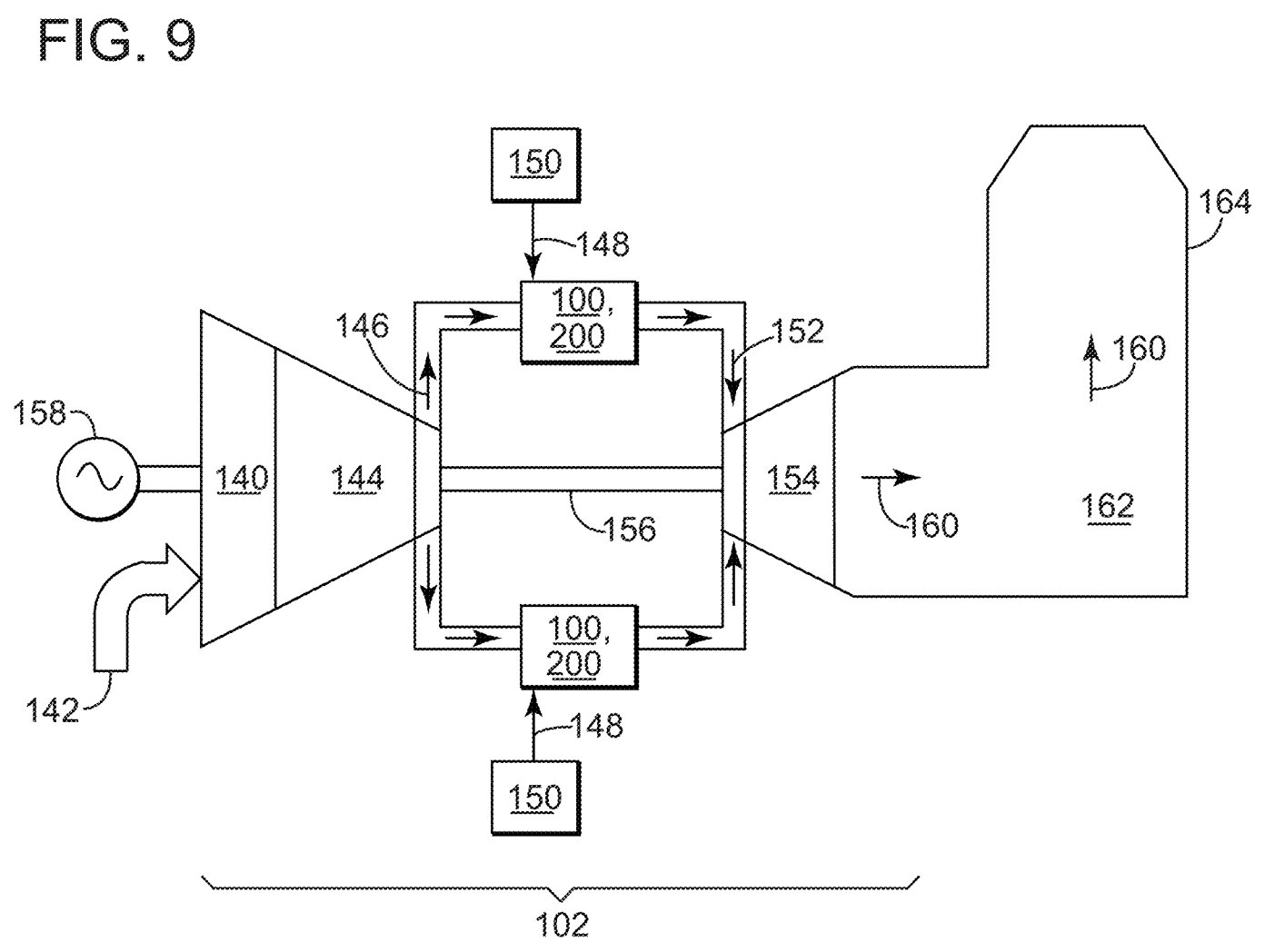

With reference to FIGS. 3, 7, and 9, the arrangement and operation of combustor 100, 200 within a gas turbine (GT) system 102 will be described. FIG. 9 shows a functional block diagram of an illustrative GT system 102 that may incorporate various embodiments of combustor 100, 200 of the present disclosure. As shown, GT system 102 generally includes an inlet section 140 that may include a series of filters, cooling coils, moisture separators, and/or other devices to purify and otherwise condition a working fluid (e.g., air) 142 entering GT system 102. Working fluid 142 flows to a compressor section where a compressor section 144 progressively imparts kinetic energy to working fluid 142 to produce a compressed working fluid 146 at a highly energized state. Compressed working fluid 146 is mixed with a fuel 148 from a fuel supply 150 to form a combustible mixture within one or more combustors 100, 200 (for simplicity, a single fuel supply 150 is shown). Combustion liner 108, 208 of combustors 100, 200 may contain and convey combustion gases 152 to a turbine section. Combustion liner 108, 208 defines a combustion chamber within which combustion occurs.

As shown in FIGS. 3 and 7, combustion liner 108, 208 may extend between head end fuel nozzle assembly 130 and aft frame 118, 219. Combustion liner 108, 208 may have cylindrical portion 109, 209 and tapered transition portion 112, 213 integral with cylindrical portion 109, 209, i.e., forming a unified body (or "unibody") construction. The combustible mixture is burned to produce combustion gases 152 having a high temperature and pressure. Combustion gases 152 flow through a turbine 154 (e.g., an expansion turbine) of the turbine section to produce work. For example, turbine 154 may be connected to a shaft 156 so that rotation of turbine 154 drives compressor section 144 to produce compressed working fluid 146. Alternately, or in addition, shaft 156 may connect turbine 154 to a generator 158 for producing electricity. Exhaust gases 160 from turbine 154 flow through an exhaust section 162 that connects turbine 154 to an exhaust stack 164 downstream from turbine 154. Exhaust section 162 may include, for example, a heat recovery steam generator (not shown) for cleaning and extracting additional heat from exhaust gases 160 prior to release to the environment.

In one embodiment, GT system 102 may include a presently commercially available gas turbine system from GE Vernova of Cambridge, MA, and may be well-suited for a 6-series gas turbine engine. The present disclosure is not limited to any one particular GT system and may be implemented in connection with other engines including, for example, the other HA, F, B, LM, GT, TM and E-class engine models of GE Vernova, and engine models of other companies. Furthermore, the present disclosure is not limited to any particular turbomachine, and may be applicable to, for example, steam turbines, jet engines, compressors, turbofans, etc.

As shown in FIGS. 3 and 7, combustor 100, 200 is at least partially surrounded by an outer casing 166 such as a compressor discharge casing and/or a turbine casing. Outer casing 166 is in fluid communication with compressor 144. Head end fuel nozzle assembly 130 (hereafter "head end assembly 130") is coupled to casing 166 at one end of combustor 100. Head end assembly 130 generally includes an end cover 168 and at least one axially extending fuel nozzle 170 that extends downstream from end cover 168 and a cap assembly 172 that extends radially and axially within combustion liner 108, 208 downstream from end cover 168 and that defines the upstream boundary of the combustion chamber.

Combustion liner 108, 208, also known as a hot gas path duct or unibody liner, extends downstream from cap assembly 172. In certain embodiments, as shown in FIG. 3, annular flow sleeve(s) 110 may at least partially surround at least a portion of combustion liner 108, e.g., cylindrical portion 109 and/or tapered transition portion 112. In other embodiments, shown in FIG. 7, flow sleeves are omitted, and a single wall combustion liner 208 is used. In any event, AFS injectors 116, 217 extend through liner 108, 208 downstream from axially extending fuel nozzle(s) 170. In certain embodiments, the axially extending fuel nozzle(s) 170 extend at least partially through cap assembly 172 to provide a combustible mixture of fuel and compressed working fluid 146 to a primary combustion zone 174 that is downstream from fuel nozzle(s) 170 to form combustion gases 152.

In certain embodiments, as shown in FIG. 3, flow sleeve(s) 110 may define one or more fluid flow passage(s) 175 for routing compressed working fluid 146 across an outer surface of combustion liner 108 (cylindrical portion 109 and/or tapered transition portion 112). In certain embodiments, the fluid flow passage 175 defined between the liner 108 and the flow sleeve 110 may be annular. In addition, flow sleeve(s) 110 may route at least a portion of compressed working fluid 146 to the one or more radially extending AFS injectors 116 to combine with fuel for combustion in a secondary combustion zone 176 that is downstream from primary combustion zone 174. Alternately, or additionally, air to the AFS injectors 116 may be supplied directly from the high-pressure plenum defined by the outer casing 166. As shown in FIG. 3, fuel passages 122 in fuel sleeve(s) 110 may deliver fuel to AFS injectors 116 from fuel supply 150.

In other embodiments, as shown in FIGS. 7 and 8A, combustion liner 208 (cylindrical portion 209 and/or tapered transition portion 213) may define one or more cooling passage(s) 224 for routing compressed working fluid 146 within combustion liner 208 (cylindrical portion 209 and/or tapered transition portion 213). In addition, as shown in FIGS. 7 and 8B, fuel passages 222 in combustion liner 208 (forward end thereof) may deliver fuel to AFS injectors 116 from fuel supply 150.

Regardless of combustor embodiment, combustor 100, 200 generally terminates at a point that is adjacent to a first stage 178 of stationary nozzles 180 of turbine 154. First stage 178 of stationary nozzles 180 at least partially defines a turbine inlet 182 to turbine 154. As noted, combustion liner 108, 208 at least partially defines a hot gas path 184 for routing combustion gases 152 from primary combustion zone 174 and secondary combustion zone 176 to turbine inlet 182 of turbine 154 during operation of GT system 102.

In operation, compressed working fluid 146 flows from compressor 144 and is routed through fluid flow passage(s) 175 and/or cooling passage(s) 224. A portion of compressed working fluid 146 is routed to head end assembly 130 of combustor 100, 200 where it reverses direction and is directed through axially extending fuel nozzle(s) 170. Compressed working fluid 146 is mixed with fuel to form a first combustible mixture that is injected into primary combustion zone 174. The first combustible mixture is burned to produce combustion gases 152. A second portion of compressed working fluid 146 may be routed through the radially extending AFS injectors 116, 217 where it is mixed with fuel 148 from fuel passages 122 in flow sleeve(s) 110 (FIG. 3) or fuel passages 222 in combustion liner 208 (FIG.

7) to form a second combustible mixture. The second combustible mixture is injected through liner 108, 208 and into hot gas path 184. The second combustible mixture at least partially mixes with combustion gases 152 and is burned in secondary combustion zone 176. Liner 108, 208 defines hot gas path 184 for routing combustion gases 152 from primary combustion zone 174 and secondary combustion zone 176 to turbine inlet 182 of turbine 154 during operation of GT system 102.

A method according to embodiments of the disclosure may include additively manufacturing combustor body 104, 204 including one-piece member 106, 206 including combustion liner 108, 208 including cylindrical portion 109, 209 and tapered transition portion 112, 213 at aft end of cylindrical portion 109, 209 of combustion liner 108, 208, at least one AFS injector 116, 217 directed into combustion liner 108, 208, and aft frame 118, 219 at an aft end of tapered transition portion 112, 213. As shown in FIGS. 3 and 6A-F, the additive manufacturing may also include forming at least one flow sleeve 110 surrounding at least part of combustion liner 108. As shown in FIG. 5, AM combustor body 104, 204 includes plurality of parallel, sintered metal layers 120. The method may also optionally additively manufacture combustor body 104 with, as shown in FIGS. 3, 6A-B and 6E-F, at least one fuel passage 122 extending longitudinally in flow sleeve(s) 110 from a forward end thereof to AFS injector(s) 116. The method may also optionally additively manufacture combustor body 104 with, as shown in FIGS. 3 and 6A-D, a plurality of cooling passages 124 extending at least partially longitudinally in combustion liner 108. The method may also optionally additively manufacture combustor body 204 with, as shown in FIGS. 7 and 8B, at least one fuel passage 222 extending longitudinally in combustion liner 208, e.g., cylindrical portion 209 thereof, from a forward end thereof to AFS injector(s) 217. The method may also optionally additively manufacture combustor body 204 with, as shown in FIGS. 7 and 8A-B, a plurality of cooling passages 224 extending at least partially longitudinally in combustion liner 208 (cylindrical portion 209 and/or tapered transition portion 213).

Figure 10:
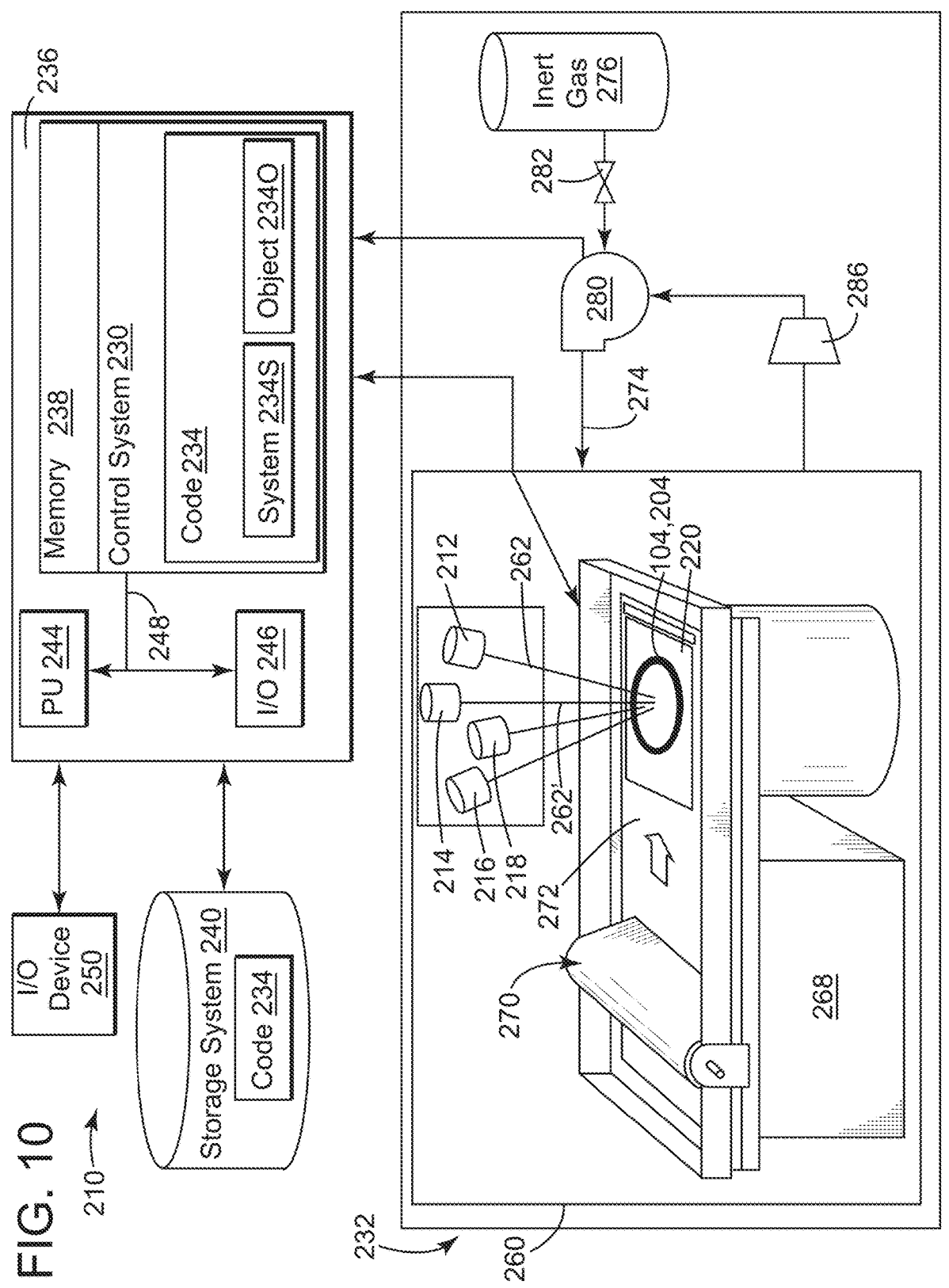
FIG. 10 shows a schematic block diagram of an illustrative additive manufacturing system for additively manufacturing a combustor body according to the various embodiments of the disclosure.

Combustor 100, 200 and AM combustor body 104, 204 may be additively manufactured using any now known or later developed technique capable of forming the large, integral body. FIG. 10 shows a schematic/block view of an illustrative computerized metal powder additive manufacturing system 210 (hereinafter 'AM system 210') for generating AM combustor body 104, 204, of which only a single layer is shown. The teachings of the disclosures will be described relative to building AM combustor body 104, 204 using multiple melting beam sources 212, 214, 216, 218, but it is emphasized and will be readily recognized that the teachings of the disclosure are equally applicable to build AM combustor body 104, 204 using any number of melting beam sources. In this example, AM system 210 is arranged for direct metal laser melting (DMLM). It is understood that the general teachings of the disclosure are equally applicable to other forms of metal powder additive manufacturing such as but not limited to selective laser melting (SLM), and perhaps other forms of additive manufacturing (i.e., other than metal powder applications). The layer of AM combustor body 104, 204 in build platform 220 is illustrated in FIG. 10 as a circular element; however, it is understood that the additive manufacturing process can be readily adapted to manufacture any shaped part of AM combustor body 104, 204 on build platform 220.

AM system 210 generally includes an additive manufacturing control system 230 ("control system") and an AM printer 232. As will be described, control system 230 executes set of computer-executable instructions or code 234 to generate combustor body 104, 204 using multiple melting beam sources 212, 214, 216, 218. In the example shown, four melting beam sources may include four lasers. However, the teachings of the disclosures are applicable to any melting beam source, e.g., an electron beam, laser, etc. Control system 230 is shown implemented on computer 236 as computer program code. To this extent, computer 236 is shown including a memory 238 and/or storage system 240, a processor unit (PU) 244, an input/output (I/O) interface 246, and a bus 248. Further, computer 236 is shown in communication with an external I/O device/resource 250. In general, processor unit (PU) 244 executes computer program code 234 that is stored in memory 238 and/or storage system 240. While executing computer program code 234, processor unit (PU) 244 can read and/or write data to/from memory 238, storage system 240, I/O device 250 and/or AM printer 232. Bus 248 provides a communication link between each of the components in computer 236, and I/O device 250 can comprise any device that enables a user to interact with computer 236 (e.g., keyboard, pointing device, display, etc.).

Computer 236 is only representative of various possible combinations of hardware and software. For example, processor unit (PU) 244 may comprise a single processing unit or may be distributed across one or more processing units in one or more locations, e.g., on a client and server. Similarly, memory 238 and/or storage system 240 may reside at one or more physical locations. Memory 238 and/or storage system 240 can comprise any combination of various types of non-transitory computer readable storage medium including magnetic media, optical media, random access memory (RAM), read only memory (ROM), etc. Computer 236 can comprise any type of computing device such as an industrial controller, a network server, a desktop computer, a laptop, a handheld device, etc.

As noted, AM system 210 and, in particular control system 230, executes code 234 to generate combustor body 104, 204. Code 234 can include, among other things, a set of computer-executable instructions 234S (herein also referred to as 'code 234S') for operating AM printer 232 and a set of computer-executable instructions 234O (herein also referred to as 'code 234O') defining AM combustor body 104, 204 to be physically generated by AM printer 232. As described herein, additive manufacturing processes begin with a non-transitory computer readable storage medium (e.g., memory 238, storage system 240, etc.) storing code 234. Set of computer-executable instructions 234S for operating AM printer 232 may include any now known or later developed software code capable of operating AM printer 232.

The set of computer-executable instructions 234O defining combustor body 104, 204 may include a precisely defined 3D model of combustor body 104, 204 and can be generated from any of a large variety of well-known computer aided design (CAD) software systems such as AutoCAD®, TurboCAD®, DesignCAD 3D Max, etc. In this regard, code 234O can include any now known or later developed file format. Furthermore, code 234O representative of combustor body 104, 204 may be translated between different formats. For example, code 234O may include Standard Tessellation Language (STL) files, which were created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 2340 representative of combustor body 104, 204 may also be converted into a set of data signals and transmitted, received as a set of data signals and converted to code, stored, etc., as necessary. Code 2340 may be configured according to embodiments of the disclosure to allow for formation of border and internal sections in overlapping field regions, as will be described. In any event, code 2340 may be an input to AM system 210 and may come from a part designer, an intellectual property (IP) provider, a design company, the operator or owner of AM system 210, or from other sources. In any event, control system 230 executes code 234S and 2340, dividing combustor body 104, 204 into a series of thin slices that assembles using AM printer 232 in successive layers of material.

AM printer 232 may include a processing chamber 260 that is sealed to provide a controlled atmosphere for combustor body 104, 204 printing. A build platform 220, upon which combustor body 104, 204 is built, is positioned within processing chamber 260. A number of melting beam sources 212, 214, 216, 218 are configured to melt layers of metal powder on build platform 220 to generate combustor body 104, 204. While four melting beam sources 212, 214, 216, 218 are illustrated, it is emphasized that the teachings of the disclosure are applicable to a system employing any number of sources, e.g., 1, 2, 3, or 5 or more. As understood in the field, each melting beam source 212, 214, 216, 218 may have a field including a non-overlapping field region, respectively, in which it can exclusively melt metal powder, and may include at least one overlapping field region in which two or more sources can melt metal powder. In this regard, each melting beam source 212, 214, 216, 218 may generate a melting beam, respectively, that fuses particles for each slice, as defined by code 2340. For example, in FIG. 10, melting beam source 212 is shown creating a layer of combustor body 104, 204 using melting beam 262 in one region, while melting beam source 214 is shown creating a layer of combustor body 104, 204 using melting beam 262' in another region. Each melting beam source 212, 214, 216, 218 is calibrated in any now known or later developed manner. That is, each melting beam source 212, 214, 216, 218 has had its laser or electron beam's anticipated position relative to build platform 220 correlated with its actual position in order to provide an individual position correction (not shown) to ensure its individual accuracy. In one embodiment, each of plurality melting beam sources 212, 214, 216, 218 may create melting beams, e.g., 262, 262', having the same cross-sectional dimensions (e.g., shape and size in operation), power and scan speed.

Continuing with FIG. 10, an applicator (or re-coater blade) 270 may create a thin layer of raw material 272 spread out as the blank canvas from which each successive slice of the final combustor body 104, 204 will be created. Various parts of AM printer 232 may move to accommodate the addition of each new layer, e.g., a build platform 220 may lower and/or chamber 260 and/or applicator 270 may rise after each layer. The process may use different raw materials in the form of fine-grain metal powder, a stock of which may be held in a chamber 268 accessible by applicator 270. In the instant case, combustor body 104, 204 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.). Other possibilities include, for example, René 108, CM 247, Mar M 247 and any precipitation harden-able (PH) nickel alloy.

Processing chamber 260 is filled with an inert gas such as argon or nitrogen and controlled to minimize or eliminate oxygen. Control system 230 is configured to control a flow of a gas mixture 274 within processing chamber 260 from a source of inert gas 276. In this case, control system 230 may control a pump 280 and/or a flow valve system 282 for inert gas to control the content of gas mixture 274. Flow valve system 282 may include one or more computer controllable valves, flow sensors, temperature sensors, pressure sensors, etc., capable of precisely controlling flow of the particular gas. Pump 280 may be provided with or without valve system 282. Where pump 280 is omitted, inert gas may simply enter a conduit or manifold prior to introduction to processing chamber 260. Source of inert gas 276 may take the form of any conventional source for the material contained therein, e.g., a tank, reservoir or other source. Any sensors (not shown) required to measure gas mixture 274 may be provided. Gas mixture 274 may be filtered using a filter 286 in a conventional manner.

In operation, build platform 220 with metal powder thereon is provided within processing chamber 260, and control system 230 controls flow of gas mixture 274 within processing chamber 260 from source of inert gas 276. Control system 230 also controls AM printer 232 and, in particular, applicator 270 and melting beam sources 212, 214, 216, 218 to sequentially melt layers of metal powder on build platform 220 to generate combustor body 104, 204 according to embodiments of the disclosure. While a particular AM system 210 has been described herein, it is emphasized that the teachings of the disclosure are not limited to any particular additive manufacturing system or method.

With further regard to a method according to embodiments of the disclosure, once AM combustor body 104, 204 is formed, as shown in FIGS. 3 and 7, it may be assembled with other parts of combustor 100 and/or connected to turbine inlet 182. For example, the method may further include coupling head end assembly 130 to a forward end of combustor body 104, 204. Head end assembly 130 may be coupled in any now known or later developed fashion, such as welding or fasteners. In addition, the method may include, as shown in FIGS. 3 and 7, coupling turbine inlet 182 to aft frame 118. Aft frame 118 may be coupled to turbine inlet 182 in any now known or later developed fashion, such as welding or fasteners. Either end of the combustor body 104, 204 may be joined to other components using seals, in addition to or instead of fasteners or weld joints.

While the Figures illustrate embodiments in which the fuel passages 122 are defined within the cylindrical portion 209 or the flow sleeve 110, it should be appreciated that the fuel passages 122 may be printed radially outward of the flow sleeve 110 (e.g., as tubes spaced apart from the exterior surface of the flow sleeve 110). The integration of the fuel passages 122 with the AFS injectors 116 and flow sleeve 110 provides many of the advantages discussed herein, including reduced leakages, reduced part counts, and simplified assembly.

The disclosure provides various technical and commercial advantages, examples of which are discussed herein. As noted, the AM combustor body lowers the costs of the combustor by eliminating the need to manufacture so many parts and then assemble the parts. For example, the AM combustor body allows for printing of the AFS injector fuel lines rather than as coupling separate fuel lines to an exterior of a flow sleeve. Almost all parts that would conventionally be separate can be printed into the combustor body. As a result, the additive manufacturing results in as much as a 70% reduction in parts within a final combustor. The AM combustor body also provides improved durability compared to conventional versions by eliminating welds and providing the ability to design out stress-rising geometries, e.g., a weld between the aft end of the tapered transition portion and the aft frame. The additive manufacturing also allows for quick and easy manufacturing updates.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A method, comprising:
additively manufacturing a combustor body including a one-piece member including: a combustion liner including a cylindrical portion and a tapered transition portion, at least one axial fuel stage (AFS) injector directed into the combustion liner, at least one fuel passage defined within and enclosed by opposed exterior surfaces of the combustion liner and extending longitudinally from a forward end thereof to the at least one AFS injector, wherein the combustion liner is solid between the opposed exterior surfaces thereof apart from the at least one fuel passage defined therewithin, at least one cooling passage defined within and enclosed by the opposed exterior surfaces of the combustion liner and extending longitudinally within the combustion liner from the forward end thereof to an aft end thereof, and an aft frame at an aft end of the tapered transition portion of the combustion liner, wherein the AM combustor body includes a plurality of parallel, sintered metal layers;
coupling a head end fuel nozzle assembly to a forward end of the combustor body; and
coupling a turbine inlet to the aft frame.

2. The method of claim 1, wherein the at least one fuel passage includes a plurality of fuel passages disposed at a same radial distance in the combustion liner.

3. The method of claim 1, wherein the at least one fuel passage is at a first radial distance in the combustion liner and the at least one cooling passage is at a second radial distance in the combustion liner.

4. The method of claim 3, wherein the second radial distance is greater than the first radial distance.

5. A combustor for a gas turbine system, the combustor comprising:
an additively manufactured (AM) combustor body including a one-piece member including:
a combustion liner including a cylindrical portion and a tapered transition portion,
at least one axial fuel stage (AFS) injector directed into the combustion liner,
at least one fuel passage defined within and enclosed by opposed exterior surfaces of the combustion liner and extending longitudinally within the combustion liner from a forward end thereof to the at least one AFS injector, wherein the combustion liner is solid between the opposed exterior surfaces thereof apart from the at least one fuel passage defined therewithin, and
at least one cooling passage defined within and enclosed by the opposed exterior surfaces of the combustion liner and extending longitudinally within the combustion liner from the forward end thereof to an aft end thereof,
wherein the AM combustor body includes a plurality of parallel, sintered metal layers.

6. The combustor of claim 5, wherein the at least one fuel passage comprises a plurality of fuel passages disposed at a same radial distance in the combustion liner.

7. The combustor of claim 5, wherein the at least one fuel passage is at a first radial distance in the combustion liner and the at least one cooling passage is at a second radial distance in the combustion liner.

8. The combustor of claim 7, wherein the second radial distance is greater than the first radial distance.

* * * * *